Figure 1:
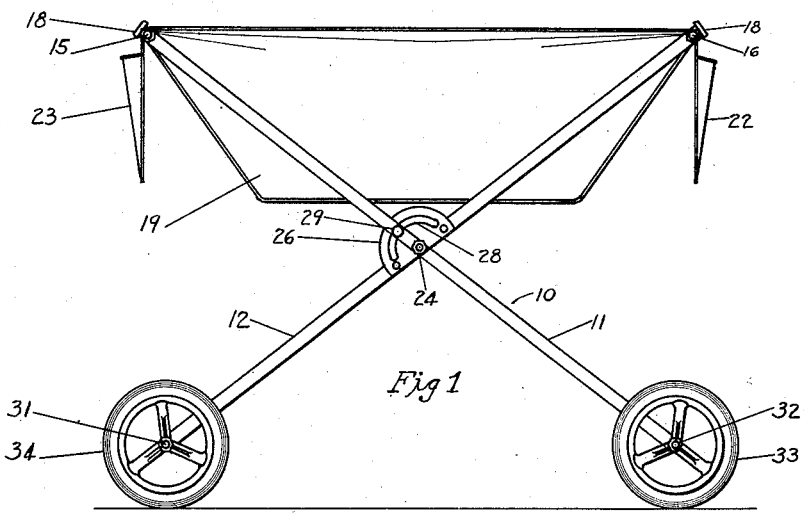

April 25, 1950

V. J. WILSON 2,505,317

VERTICALLY ADJUSTABLE GENERAL
UTILITY HOUSEHOLD DEVICE
Filed Sept. 13, 1946

INVENTOR.
VICTOR J. WILSON

BY *Thomas F. Healy*

Patented Apr. 25, 1950

2,505,317

UNITED STATES PATENT OFFICE 2,505,317

VERTICALLY ADJUSTABLE GENERAL UTILITY HOUSEHOLD DEVICE

Victor J. Wilson, Phoenix, Ariz.

Application September 13, 1946, Serial No. 696,713

2 Claims. (Cl. 280—43)

The present invention relates to an article designed for general household utility, and more particularly to a collapsible and adjustable cart.

A primary object of this invention is to provide a cart, with a canvas basket removably attached, for transporting laundry from the washing machine to the clothes line, and which can be folded vertically for convenient storage when not in use, or also employed as a clothes hamper.

Another object is to provide a cart, with a canvas basket removably attached, for use as a bassinet, or without the canvas basket, as a tea cart or coffee table.

A further object is to provide a collapsible and adjustable cart comprising a frame including two pairs of oppositely disposed cross bars crossed and pivoted together at their points of intersection with means associated with said cross bars to selectively lock them against relative movement in any desired position substantially throughout a range of approximately 150°.

Yet another object is to provide a light weight inexpensive cart for general household utility composed substantially of light weight tubular metal or rods, such as aluminum.

Other and further objects and advantages of this invention will be apparent from the following description thereof and from the claims appended thereto.

Figure 2:
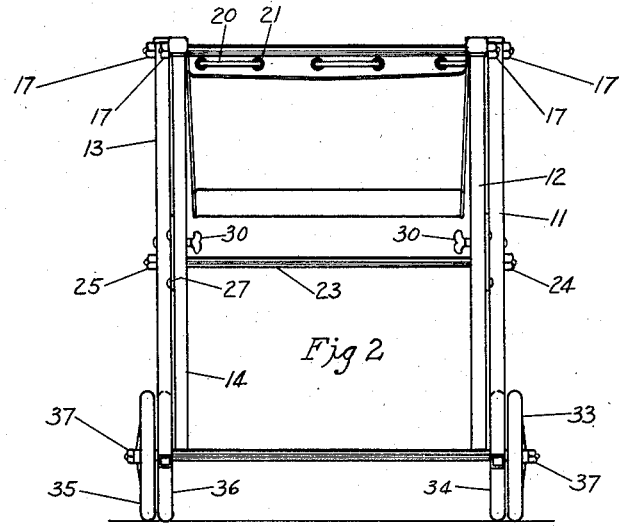
Figure 3:
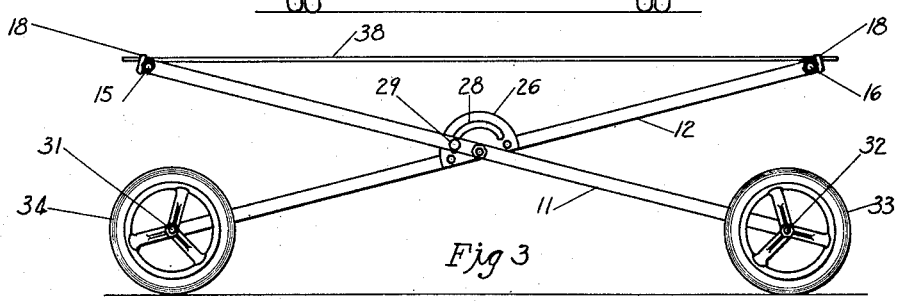

Referring now to the drawing wherein like numerals refer to like or corresponding parts throughout the several views:

Figure 1 is a side elevation of the household utility device, and embodies the features of my invention, Figure 2 is an end elevation of the utility device, with the device in folded position, and Figure 3 is a side elevation showing the utility cart, with the canvas basket removed and being provided with a table top.

In the drawing, with particular reference to Figure 1 thereof, the numeral 10 generally relates to a frame including two pairs of oppositely disposed cross bars designated by the numerals 11, 12, 13 and 14. Each cross bar 11, 12, 13 and 14, is preferably formed of an aluminum tube of rectangular cross section. Each of the tubes 11, 12, 13 and 14 is provided at its upper end portion with suitable apertures. Aluminum rods 15 and 16 have their ends secured in the apertures disposed in the upper portions of said tubular members 11, 12, 13 and 14, and each of said rods 15 and 16, has a threaded portion at its outer ends to receive nuts 17 to hold the rods in position.

Caps 18 are fitted over the upper ends of the crossed tubular members and held in place by self-tapping metal screws fitted into holes drilled into the top cross bars 15 and 16 respectively.

A canvas basket 19 is removably secured to the rods 15 and 16 respectively, by cords 20 which are disposed through eyelets 21 and fastened around the rods to secure the basket in place. The basket 19 is additionally provided at both ends thereof, with pockets 22 and 23. The pockets 22 and 23 are adapted to receive clothes pins or other household articles.

The tubular members 11, 12, 13 and 14 are each provided intermediate the ends thereof with suitable apertures. These apertures register with each other at the point that the tubular member 11 crosses the tubular member 12, and the tubular member 13 crosses the tubular member 14. A brace rod 23 has the ends thereof disposed through the said apertures appearing in the tubular members intermediate the ends thereof with said rod 23 being threaded at its outer ends to receive nuts 24 and 25 respectively.

A slotted side bracket 26 is secured to the outside portion of the tube 12 at the point where the tube 12 intersects the rod 11. Likewise, a similar slotted side bracket 27 is secured to the outside of the inner tube 14 at the point the tube 14 intersects the outer tube 13. A washer may be inserted between the side brackets 26 and 27 and the outer tubular members 11 and 13 respectively, to act as a spacer.

Each side bracket is provided with an arcuate slot designated as 28. Each outer tube 11 and 13 is provided with an aperture adapted to receive a threaded bolt 29 which is disposed through the slots 28 to receive a wing nut 30.

The lower end portions of the tubular members 11, 12, 13 and 14 are each apertured to respectively receive front and rear axles 31 and 32. Ground engaging wheels 33, 34, 35 and 36 are disposed on the outer threaded ends of the axles 31 and 32, which are adapted to receive nuts 37 to secure the said wheels in position for operation.

Referring now to Figure 3, there is shown a modified form of the invention, wherein the canvas basket 19 has been removed, and the frame 10 lowered to its lowermost position. Upon the rods 15 and 16 there is disposed a table top member 38, which is held in position against lateral movement by the upper ends of the tubular members 11, 12, 13 and 14. The utility device in this form may be employed as a coffee table or the like.

In the operation of the utility device, the frame member 10 may be adjusted as to height, by loosening the wing nuts 30 associated with each side bracket, so as to permit the threaded pins or bolts 29 to move throughout the length of the slots 28 to any desired position. The tubes 11, 12, 13 and 14 may then be secured in fixed relationship by tightening the wing nuts 30 on the pins 29 which prevent the pins 29 from moving in the arcuate slots 28 of the respective side brackets 26 and 27. In Figure 1, with the canvas basket 19 secured to the rods 15 and 16, the frame 10 can only be lowered to a certain position because of the restraining influence of said basket 19. However, upon a removal of the basket 19, the tubular members 11, 12, 13 and 14 may be moved through an arc of approximately 150° and fixed in any relative position by tightening the wing nuts 30 upon the pins 29.

In its broad aspects, this invention relates to a household device comprising a frame including two pairs of oppositely disposed cross bars crossed and pivoted together at their points of intersection, an element provided with an arcuate slot carried by one of said cross bars in each pair, a slot engaging pin carried by the other of said cross bars in each pair and adapted for movement throughout the length of said slot, means associated with said slot engaging pin to selectively lock said pin in a fixed position in said slot to prevent relative movement of said cross bars, and two rods each connecting the upper portions of said cross bars in each pair.

Various modifications of this invention will be apparent to those skilled in the art without departing from the spirit thereof, and therefore it is desired to be limited only by the scope of the appended claims.

What I claim is:

1. A collapsible and adjustable household device comprising a frame including two pairs of oppositely disposed cross bars crossed and pivoted together at their points of intersection, an article supporting member mounted on the upper portion of said frame and movable therewith during pivotal movement of said cross bars to adjust the height of said member, means for effecting minute vertical adjustment of said frame and said member comprising a bracket mounted on one of said cross bars in each pair and having an arcuate guide slot therein, a threaded guide pin secured to the other of said cross bars in each pair and adapted for minute movement in both directions within said guide slot throughout the entire length of said slot, a wing nut engaging said threaded pin to selectively lock said pin in any of its minute adjusted positions throughout the entire length of the slot to prevent relative pivoted movement of said cross bars in both directions, and ground engaging wheels supported by the lower end portion of said frame.

2. A collapsible and adjustable household device comprising a frame including two pairs of oppositely disposed cross bars crossed and pivoted together at their points of intersection for pivotal movement in opposite directions for effecting minute adjustments of the height of the upper ends of the bars, front and rear rods connecting the upper portions of said cross bars in each pair and movable with said cross bars, a basket secured to said upper front and rear rods and movable therewith during pivotal movement of said cross bars to adjust the height of said basket, means for guiding said cross bars in their pivotal movements comprising a bracket mounted on one of said cross bars in each pair and having an arcuate slot therein having a range of approximately one hundred fifty degrees, a threaded pin secured to the other of said cross bars in each pair and adapted for minute movement in opposite directions throughout the entire length of said slot, a wing nut engaging said threaded pin to selectively lock said pin in any of its minute adjusted positions throughout the entire length of the slot to prevent relative movement of said cross bars, the curvature of said slot having the pivot of the cross bars as its center and said pin being restrained by the sides of said slot to follow the curvature of said slot, whereby the cross bars will be constrained to follow true arcuate paths about their pivots to relieve the pivots of strain.

VICTOR J. WILSON.

REFERENCES CITED

The following references are of record in the file of this patent:

UNITED STATES PATENTS

| Number | Name | Date |
| --- | --- | --- |
| 679,750 | Hoffman | Aug. 6, 1901 |
| 1,081,221 | Durkin | Dec. 9, 1913 |
| 1,087,878 | Harrah | Feb. 17, 1914 |
| 1,261,184 | Taylor, Jr. | Apr. 2, 1918 |
| 1,559,988 | Ryan | Nov. 3, 1925 |
| 1,744,718 | Baumgartner | Jan. 28, 1930 |
| 2,354,941 | Treitel | Aug. 1, 1944 |
| 2,384,873 | Barksdale | Sept. 18, 1945 |

FOREIGN PATENTS

| Number | Country | Date |
| --- | --- | --- |
| 19,139 | Great Britain | 1905 |